(12) United States Patent
Balgard et al.

(10) Patent No.: US 8,051,215 B2
(45) Date of Patent: Nov. 1, 2011

(54) CONFIGURING OF AN INTELLIGENT ELECTRONIC DEVICE

(75) Inventors: Lennart Balgard, Arboga (SE); Krister Landernas, Vasteras (SE); Tobias Gentzell, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 12/977,914

(22) Filed: Dec. 23, 2010

(65) Prior Publication Data

US 2011/0138083 A1 Jun. 9, 2011

Related U.S. Application Data

(63) Continuation of application No. PCT/EP2009/058021, filed on Jun. 26, 2009.

(30) Foreign Application Priority Data

Jun. 26, 2008 (EP) .................................... 08159063

(51) Int. Cl.
G06F 3/00 (2006.01)
H05K 7/00 (2006.01)

(52) U.S. Cl. .......................................... 710/8; 361/728

(58) Field of Classification Search ....... 710/8; 361/728
See application file for complete search history.

(56) References Cited

U.S. PATENT DOCUMENTS

| | | | |
|---|---|---|---|
| 6,842,794 | B2 | 1/2005 | Tang |
| 7,191,076 | B2 | 3/2007 | Huber et al. |
| 2002/0092018 | A1 | 7/2002 | Biederman et al. |
| 2005/0102603 | A1 | 5/2005 | Tapper et al. |
| 2006/0269066 | A1* | 11/2006 | Whitehead et al. ............ 380/270 |
| 2007/0055889 | A1* | 3/2007 | Henneberry et al. ......... 713/186 |
| 2007/0106764 | A1 | 5/2007 | Mansfield |
| 2009/0070051 | A1* | 3/2009 | Vetter et al. ..................... 702/57 |
| 2009/0070062 | A1* | 3/2009 | Kirrmann et al. ............. 702/122 |
| 2010/0217967 | A1* | 8/2010 | Viswanathan et al. ............ 713/2 |
| 2010/0256832 | A1* | 10/2010 | Kirrmann et al. ............. 700/293 |

FOREIGN PATENT DOCUMENTS

| | | |
|---|---|---|
| DE | 102004062967 A1 | 7/2006 |
| EP | 0602787 A2 | 6/1994 |
| WO | 2007036178 A1 | 4/2007 |

OTHER PUBLICATIONS

European Search Report; Application No. EP 08 15 9063; Nov. 10, 2008; 5 pages. International Search Report and Written Opinion of the International Searching Authority; PCT/EP2009/058021; Aug. 3, 2009; 16 pages.
SAE IT Systems; "SetITV4, Leistungsmerkmale net-line Stationsleittechnik"; dated Nov. 15, 2007 www.sae-it.de/pool/download/Leistungsmerkmale setITV4.pdf; 12 pages.

* cited by examiner

*Primary Examiner* — Henry Tsai
*Assistant Examiner* — Hyun Nam
(74) *Attorney, Agent, or Firm* — St. Onge Steward Johnston & Reens LLC

(57) ABSTRACT

An intelligent electronic device and a method for activating a function in an intelligent electronic device; the device includes an inter-module bus, a first interface and a number of hardware modules connected to each other via the inter-module bus. The modules include a process control module including a control unit that senses the types of hardware modules connected to the inter-module bus, that obtains set-up data from an external portable data carrier, where the set-up data includes configuration data and verification data, where the verification data includes hardware type data related to the modules in the device, that compares the obtained verification data with own verification data including data regarding the sensed hardware type, and that activates a protection function only if there is a match between all verification data being compared.

17 Claims, 3 Drawing Sheets

```
<VERIFICATION DATA>
     <MODULE 1 = T1*, P1*>
     <MODULE 2 = T2*, P2*>
     <MODULE 3 = T3*, P3*>
     <MODULE 4 = T4*, P4*>
</VERIFICATION DATA>
<PROTECTION FUNCTION>
     <CONFIGURATION>
     <CONFIGURATION SETTINGS>
     </CONFIGURATION>
</PROTECTION FUNCTION>
```

CONFIGURING OF AN INTELLIGENT ELECTRONIC DEVICE

CROSS-REFERENCE TO RELATED APPLICATIONS

The present application is a continuation of pending International patent application PCT/EP2009/058021 filed on Jun. 26, 2009 which designates the United States and claims priority from European patent application 08159063.0 filed on Jun. 26, 2008, the content of which is incorporated herein by reference.

FIELD OF INVENTION

The present invention generally relates to the field of substation automation or distribution automation systems and more particularly towards an intelligent electronic device for provision in Substation Automation or Distribution Automation systems as well as to a method for activating a function in an intelligent electronic device.

BACKGROUND

Local process equipment in substation automation or distribution automation systems, such as circuit breakers and transformers, are normally controlled and/or protected by intelligent electronic devices (IEDs). These intelligent electronic devices in many cases communicate with other higher control and protection level devices using a computer communication system. When an intelligent electronic device is to be configured it would then normally receive a configuration file over such a computer communication network.

However, not all intelligent electronic devices are provided with this communication ability. Some may be provided as isolated devices being separated from such a computer communication network. In this case other ways of configuring the intelligent electronic device has to be provided.

One way to provide configurations to an intelligent electronic device is through the use of a portable non-volatile data carrier, such as a memory stick, which is brought and connected to the device in question.

This has been described in relation to other fields of technology.

US 2002/0092018, which is related to the field of cable or satellite television, does for instance describe the use of a memory stick for providing a boot loader program and an alternative application software program, an upgraded application software program or a corrective application software program to a set top box. The boot loader program also checks to see if the software is valid.

US 2007/0106764 describes configuration of a consumer electronic device, like a television set. Network configurations are here provided to a configuration-file transfer device including a USB memory and IR transmitter. The configuration file is then transmitted to the consumer device using the IR transmitter. The document also mentions that the configuration file can include other data, such as user personalization data.

U.S. Pat. No. 6,842,794 describes how a flash memory device gets connected to a data processing system and then activates this system. There are however no configurations.

In relation to intelligent electronic devices WO 2007/036178 describes using keys provided in a USB memory for verifying a user according to defined user types.

The document "SetITV4, Leistungsmerkmale net-line Stationsleittechnik" dated Nov. 15, 2007 and downloadable from www.saeit.de/pool/download/ Leistungsmerkmale_setITV4.pdf briefly mentions that IEC61850 compliant devices can be configured via a USB memory stick.

In order to lower the costs of these types of isolated intelligent electronic devices, the number of user interfaces are often kept to a minimum. This means that for instance keyboards or keypads as well as displays may not be present.

An intelligent electronic device may furthermore be modular in that it includes various hardware modules providing different function of the IED. One way of providing modularized hardware for an intelligent electronic device is described in U.S. Pat. No. 7,191,076. Here there is an intelligent electronic device having a base module to which external function modules can be attached. These external function modules offer expandable features such as additional power management, additional communications, advanced communications, wireless communications, analog and digital input/output, data logging etc.

However, before the isolated IED with a limited number of user interfaces and being made of such modular hardware is activated it may be of interest to make further investigations concerning the device for enhancing the security. This may be hard to do given the limited number of user interfaces.

There is therefore a need for improvement in relation to performing configuration of an isolated intelligent electronic device.

SUMMARY OF THE INVENTION

The present invention is generally directed towards providing improved security when configuring an intelligent electronic device.

One object of the present invention is therefore to provide an intelligent electronic device that provides an improved security when being configured.

This object is according to a first aspect of the present invention solved through an intelligent electronic device for provision in Substation Automation or Distribution Automation systems and comprising:
an inter-module bus,
a first interface to an external portable data carrier, and
a number of hardware modules connected to each other via said inter-module bus, said modules implementing various functions of the device and including a process control module for handling at least one protection and/or control function,
said process control module including
a second interface to the inter-module bus, and
a control unit arranged to
sense, via said second interface, the types of hardware modules connected to the inter-module bus,
obtain set-up data from an external portable data carrier connected to the first interface, said set-up data including configuration data relating to a protection and/or control function implemented by the process control module as well as verification data, said obtained verification data including hardware type data relating to the modules in the device,
compare the obtained verification data with own verification data, which own verification data includes data regarding the sensed hardware type, and
activate the protection and/or control function only if there is a match between all verification data being compared.

Another object of the present invention is to provide a method for activating a function in an intelligent electronic device, which provides improved security when the device is configured.

This object is according to a second aspect of the present invention solved through a method for activating a function in an intelligent electronic device provided in a Substation Automation or Distribution Automation system, the intelligent electronic device comprising a number of hardware modules connected to each other via an inter-module bus, the modules implementing various functions of the device and including a process control module for handling at least one protection and/or control function of the device, the method comprising the steps of:

sensing the types of hardware modules connected to the inter-module bus, obtaining set-up data from an external portable data carrier, said set-up data including configuration data relating to a protection and/or control function implemented by the process control module as well as verification data, said obtained verification data including hardware type data relating to the modules in the device, comparing the obtained verification data with own verification data, which own verification data includes data regarding the sensed hardware type, and activating the control and/or protection function only if there is a match between all verification data being compared.

The present invention has a number of advantages. It allows a field operator to configure the device and at the same time verify that the installation is correct, i.e. verify that the device includes the proper modules. This enhances the security in the system. This is furthermore done in a user friendly way. The field operator does not have to have any special skills. Through this way of providing configurations it is furthermore not possible to perform unauthorized configuration changes in the field. No expensive user interfaces are needed and therefore the cost of the device can also be kept low.

BRIEF DESCRIPTION OF THE DRAWINGS

The present invention will in the following be described with reference being made to the accompanying drawings, where FIG. 1 schematically shows a substation automation system including an intelligent electronic device being connected to a piece of local system equipment.

DETAILED DESCRIPTION OF THE INVENTION

In the following, a detailed description of a preferred embodiments of a device according to the present invention will be given.

Figure 1:
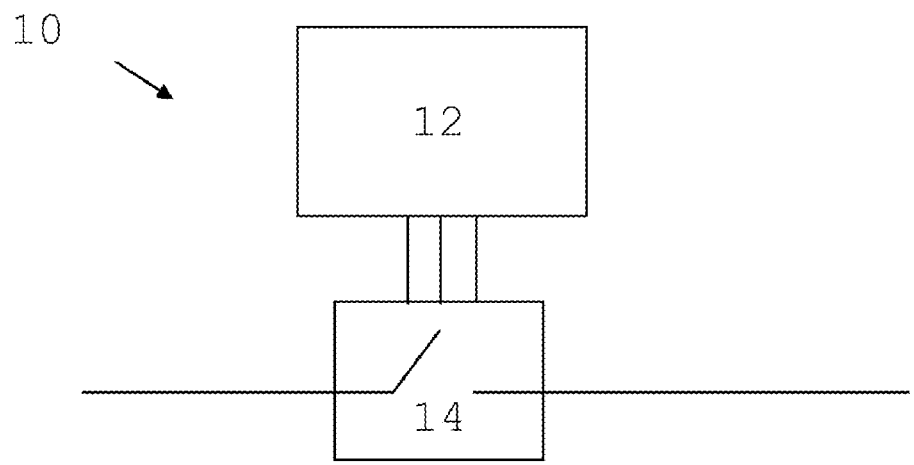

The present invention may be provided in a substation automation or distribution automation system. One such system 10 is schematically shown in FIG. 1. In FIG. 1 there is shown an intelligent electronic device (IED) 12. The IED 12 is connected to a piece of local system equipment 14. This piece of local equipment 14 may also be considered as a process interface device because it is an interface to a process or a part of a process being controlled or monitored by the IED 12. This process is typically an electrical process, like an electrical power generation or transmission process or an electrical power supply process. In this regard the piece of local equipment may be a piece of equipment such as a circuit breaker or a transformer. The piece of local equipment 14 here has direct point-to-point connections to the IED 12. As an example there are here three such connections between the IED 12 and the piece of equipment 14. The IED 12 here typically performs control and/or protection in relation to the process and the piece of local system equipment using a protection and/or control function.

The substation automation or distribution automation system may include several further intelligent electronic devices, HMIs (human Machine Interface) and substation controllers, which may be interconnected via a computer communication network. Theses devices could then communicate via such a computer communication network using the IEC 68150 communication protocol. However, the IED 12 according to the present invention is isolated from such devices and therefore they are not shown in FIG. 1.

Figure 2:
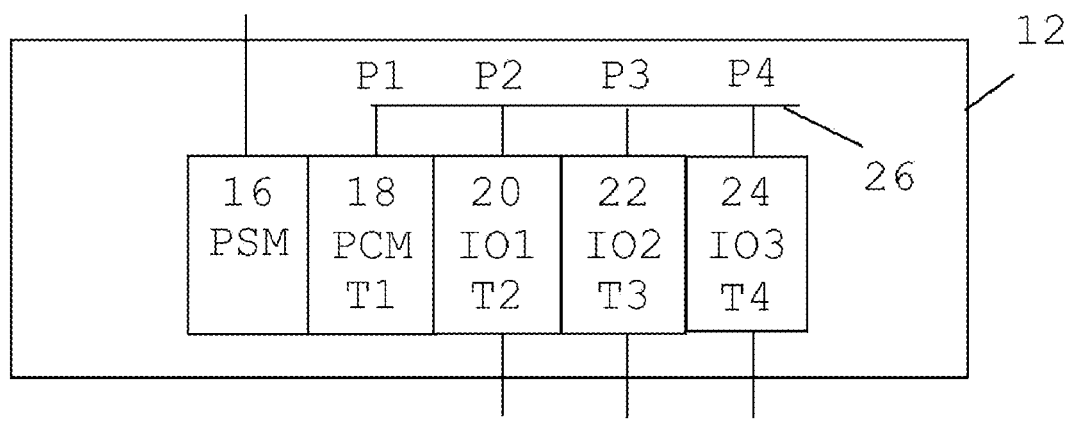
FIG. 2 shows a block schematic of an intelligent electronic device according to the present invention.

FIG. 2 shows a block schematic of the IED 12 according to the present invention. The IED 12 is a modular device. It is modular in that it includes a number of hardware modules 16, 18, 20, 22 and 24 providing separate functionalities of the IED 12. These hardware modules may be replaceable and mechanically separable. This means that it is possible to vary the number and types of hardware modules in the IED 12. There is here a first hardware module 16, which is a power supply module PSM that is connected to a power supply for receiving power for the whole IED 12 and for providing power to the rest of the modules in the IED. Power for the power supply module may here be received from the electrical process that the piece of equipment 14 is an interface to. To this first module 16 there is connected a second module 18, which is a process control module PCM.

The second module 18 is here connected to a third module 20, which is a first I/O module 101 that may be a first type of input module, for instance an input module handling analog input values. This is followed by a fourth module 22, which is here a second I/O module 102 that may be a second type of input module, like one handling digital input values. This fourth module 22 is here followed by a fifth module 24, which is here a third I/O module 103 that may be a first type of output module, for instance an output module handling digital output values. The I/O modules 20, 22 and 24 are provided for direct communication with local system equipment and therefore here have direct point-to-point connections with the pieces of local system equipment in order to provide and receive data from these pieces of equipment, like the piece of local system equipment in FIG. 1. There are normally a fixed number of such connections per I/O module. These are here being shown as one per I/O module. It should however be realized that this number may be varied and that this variation may also differ between different types of I/O modules. In the present example the first I/O module 20 has one data connection, the second I/O module 22 has one data connection and the third I/O module 24 has one data connection that all lead to the piece of local equipment shown in FIG. 1. As is evident from the description made above the IED may be connected to several such pieces of equipment using several data connections.

The various modules, except for the power supply module 16, are furthermore each provided with a respective type identifier T1, T2, T3 and T4. The second module 18 thus has a first type identifier T1, the third module 20 has a second type identifier T2, the fourth module 22 has a third type identifier T3 and the fifth module 24 has a fourth type identifier T4. A type identifier indicates what type of module it is, for instance type of I/O module or type of process control module perhaps together with brand or version indications. A type identifier is then stored internally in each such module.

The various modules, except for the power supply module 16, are furthermore interconnected or connected to each other by an inter-module data bus 26. As the various modules are replaceable they can, when being mounted, be provided in any position on the bus 26. In order to provide information on the correct position each connected module may also provide data, from which its position on the data bus 26 can be gathered. As an example the second module 18 is here connected to a first position P1, the third module 20 is here connected to a second position P2, the fourth module 22 is here connected to a third position P3 while the fifth module 24 is here connected to a fourth position P4.

Figures 3, 4:
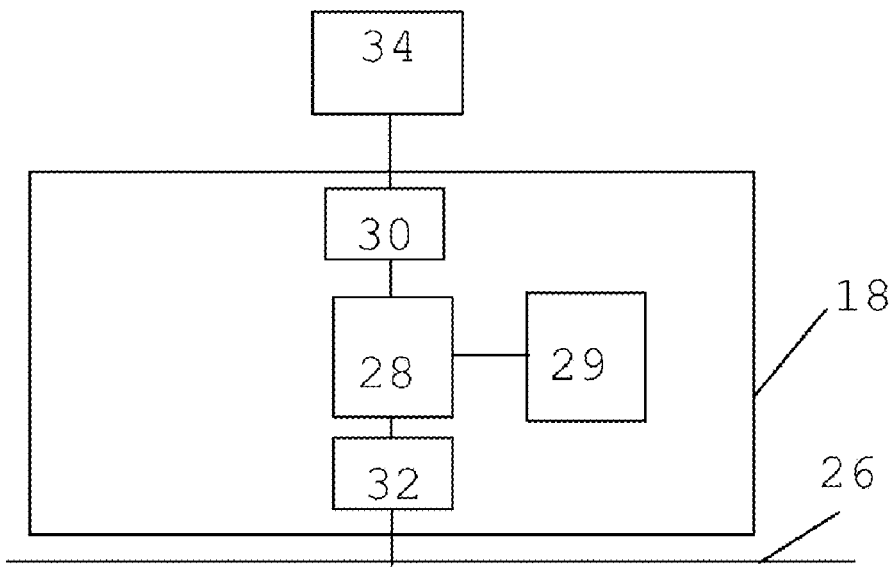
FIG. 3 shows a block schematic of a process control module in the intelligent electronic device of FIG. 2, FIG. 4 schematically shows set-up data provided for the intelligent electronic device of FIG. 2 in the form of a configuration file, and FIG. 5 schematically shows a number of method steps taken by the process control module in order to active a protective function.

The process control module 18 in the IED is shown in more detail in a block schematic provided in FIG. 3. The process control module 18 includes a control unit 28 providing processing functionality, for instance in relation to control of the piece of local system equipment and/or protection in relation to one or more system conditions. The control unit 28 thus handles at least one protection and/or control function. The control unit 28 is also connected to a verification data store 29 as well as to a first interface 30 and to a second interface 32. The first interface is an interface to a portable non-volatile data carrier 34, and may be provided as a USB port on the module 18, while the second interface 32 is a bus interface 46 to the inter-module bus 26. The data carrier 34 is thus not a part of the IED, but may be connected to it via the first interface 30.

The data carrier in FIG. 3 provides set-up data for the TED in the form of a configuration data file 36, the contents of which are schematically outlined in FIG. 4. The configuration data file 36, which may be provided as an XML file, includes two sections, a first section including verification data. The verification data here includes verification data regarding the type T1* and position P1* of a first module, regarding the type T2* and position P2* of a second module, regarding the type T3* and position P3* of a third module as well as regarding the type T4* and position P4* of a fourth module. The data may here be provided as type and position indicators. The second section relates to a protection and/or control function being provided by the process control module and here includes configuration settings to be applied in this function, which is here a protection function. The file may also include configuration settings concerning the functions of the other modules connected to the inter-module bus.

Figure 5:
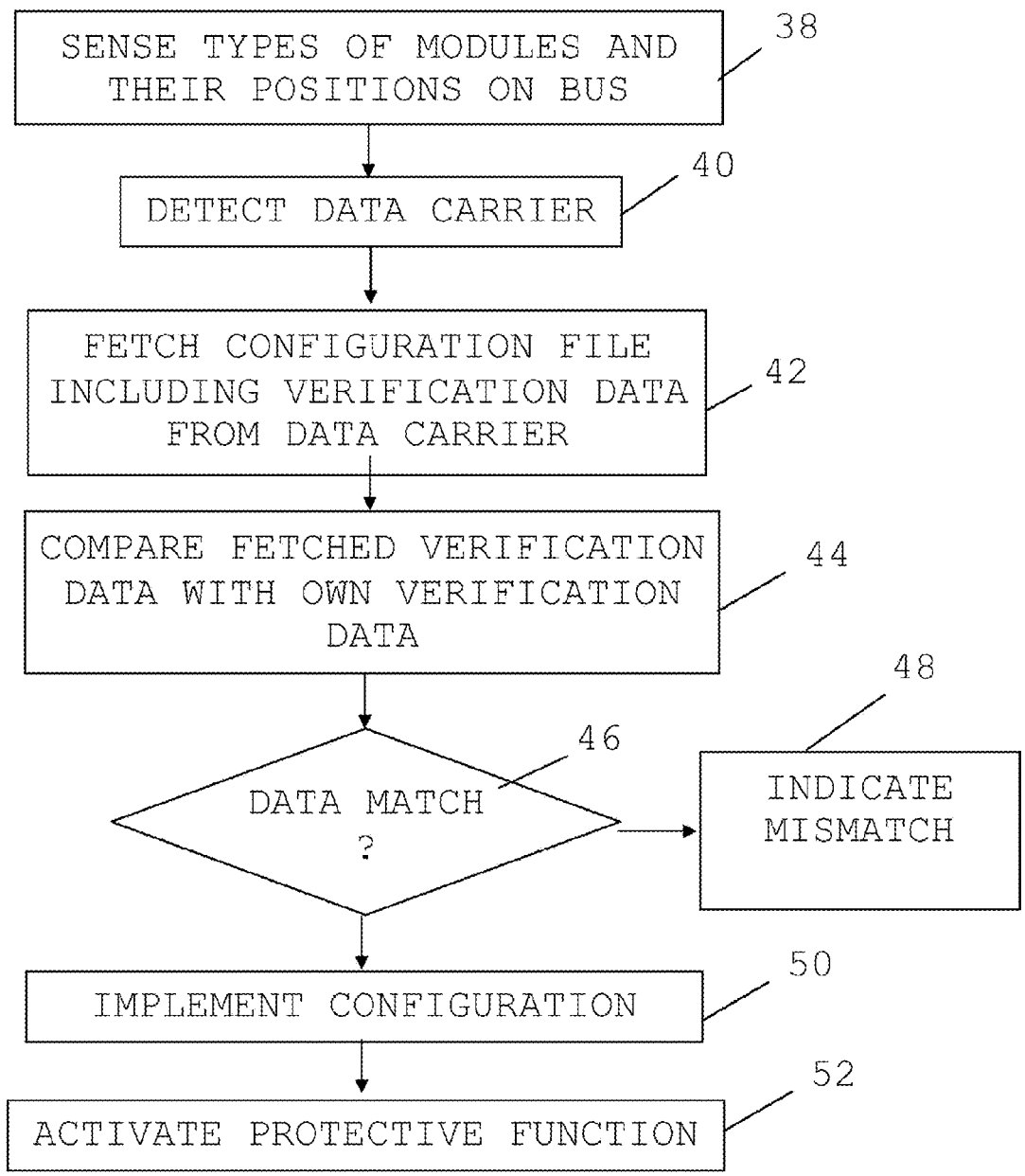

Now the functioning of the present invention will be described with reference being made to the previously described FIGS. 1-4 as well as with reference being made to FIG. 5, which shows a number of method steps taken by the process control module 18 in order to activate an exemplifying protective function.

As the IED 12 is placed in an isolated position in the substation automation and automation distribution system 10, power is first supplied to the modules 18-24 by the power supply module 16. At this power up, the control unit 28 of the process control module 18 first senses what types of modules that are connected to the bus and their positions, step 38. This may be done through the use of a separate daisy chain connection between the various modules. At power up the first module connected to the power supply module 16 may receive an initiation signal on this separate connection. This module, which is here the process control module 18, then initiates itself and announces its functionality, including module type, on the inter-module bus 26. Since the module in question is the process control module 18 which keeps track of positions and types of modules, it then knows that itself has the first position P1. The process control module 18 then forwards the initiation signal to the next module in the chain via the separate connection. The next module, which is here the first I/O module 20, then initiates itself and announces its functionality, including module type, on the inter-module bus 26. As the control unit 28 of the process control module 20 receives this announcement via the second interface 32, it then knows what type of module it was, but also the position because of the order in which initiation and announcement was made. It thus knows that the first I/O module 20 has the second position P2, since it is the second module performing initiation. Thereafter the first I/O module 20 forwards the initiating signal to the next module in the chain via the separate connection, which next module 22 then initiates itself and announces its functionality. In this way initiation is performed sequentially and the control unit 28 of the process control module 18 senses the type and the positions until all modules have been initiated. The control unit 28 of the process control module 18 then stores this data as verification data in the verification data store 29. It furthermore stores the position data as position indicators and the type data as type indicators. It thus stores the type data T1 and position data P1 of itself, the type data T2 and position data P2 of the third module 20, the type data T3 and position data P3 of the fourth module 22 and the type data T4 and position data P4 of the fifth module 24 in the store 29. The type data T1 of the process control module 18 itself may already be stored together with the own position data P1 in this store 29, since it knows its own type and may always be the module having the first position, i.e. the module being closest to the power supply module 16.

As mentioned earlier the control unit 28 of the process control module 18 does include a function for protection and/or control of the process. In the present example this is a protection function only. However, the function is not yet configured and therefore also not activated. In order to do this a field operator has to bring a portable non-volatile data carrier 34 including set-up data to the IED 12. Such a carrier can be a CD ROM disc or a memory stick.

As a field operator brings such a data carrier 34 to the IED 12 and connects it to the first interface 30 of the process control module 18, the control unit 28 detects that this has been done, step 40. Thereafter the control unit 28 obtains the set up data in the form of the configuration file 36 from the data carrier 34. It does this through fetching the configuration file 36 from the data carrier 34 via the first interface 30, step 42. As mentioned earlier the configuration file 36 includes verification data. The control unit 28 now goes on and compares this fetched verification data in the configuration file 36 with the own verification data that is stored in the verification data store 29, step 44. It thus compares the stored position and type indicators of itself T1 and P1 with the corresponding indicators T1*, P1* in the fetched file 36, compares the stored position and type indicators T2 and P2 of the first I/O module 20 with the corresponding position and type indicators T2*, P2* in the fetched file, compares the stored position and type indicators T3 and P3 of the second I/O module 22 with the corresponding position and type indicators T3*, P3* in the fetched file and compares the stored position and type indicators T4 and P4 of the third I/O module 24 with the corresponding position and type indicators T4, P4 in the fetched file. Each item (i.e. indicator) of own verification data is thus compared with a corresponding item (indicator) of fetched verification data. If any of these do not match, step 46, the control unit 28 indicates that there is a mismatch, step 48. This may be done through providing a sound or visual indication, for instance a certain color like red, which may be provided through a light emitting diode on the exterior of the IED. If however all verification data that was compared match, step 46, then the control unit 28 goes on and implements the configuration of the protective function, step 50. This may be followed by implementing configurations of the I/O modules 20, 22 and 24. For this reason the control unit 28 may transfer configuration settings to the respective I/O modules via the second interface 32 and the inter-module bus 26. Thereafter the control unit 28 goes on and activates the protective function, step 52. It is here possible that an activated protective function may be signaled through a sound or a visual indication, like a certain color, for instance green, which may also be provided through a light emitting diode.

In this way the field operator can configure the IED and at the same time verify that the installation is correct, i.e. verify that the IED includes the proper modules at their intended positions. This enhances the security in the system. This is furthermore done in a user friendly way. The field operator does not have to have any special skills. Through this way of providing configurations it is furthermore not possible to perform unauthorized configuration changes in the field. Since no expensive user interfaces are needed the cost of the IED can also be kept low. The field operator can also get a direct indication of if the installation is correct or not in a simple manner through a sound or light indication.

The control unit of the process control module may be provided in the form of a processor with corresponding program memory including computer program code for performing its functionality, while the verification data store may be a memory like a RAM memory.

There are some further details that it is possible to provide according to the present invention. The verification data on the carrier may include a device identifier or a code that is compared with a pre-stored device identifier or code. This further enhances the security in identifying the correct IED.

If there is a difference between the verification data stored in the verification data store and the verification data that is fetched, it is furthermore possible to store data enabling identifying the differences on the data carrier. One way is to copy all the verification data provided in the verified data store to the data carrier. It is also possible to only copy the own verification data that differs. In this way the data carrier may be brought back to a system engineer, which may identity where the fault lies and perform corrective actions.

There are a number of possible further variations that can be made to the present invention apart form those already mentioned. The first interface is not limited to being provided on the process control module. It may for instance be provided on the inter-module bus. It is furthermore possible that the position data is not investigated, but only the types of modules. The way position data was sensed may furthermore be performed differently. Each module may be provided with position data in the form of type indicators and may automatically send them out on the inter-module bus at power up. Alternatively the process control unit may query the modules of this information. The position data can also be obtained through detecting the connections to the inter-module bus that the modules use. Position data may here be a part of the communication protocol used.

From the foregoing discussion it is evident that the present invention can be varied in a multitude of ways. It shall consequently be realized that the present invention is only to be limited by the following claims.

The invention claimed is:

1. An intelligent electronic device for provision in Substation Automation or Distribution Automation systems and comprising:
   an inter-module bus,
   a first interface to an external portable data carrier, and
   a number of hardware modules connected to each other via said inter-module bus, said modules implementing various functions of the device and including a process control module for handling at least one protection and/or control function,
   said process control module including
      a second interface to the inter-module bus, and
      a control unit arranged to sense, via said second interface, the types of hardware modules connected to the inter-module bus,
      obtain set-up data from an external portable data carrier connected to the first interface, said set-up data including configuration data relating to a protection and/or control function implemented by the process control module as well as verification data, said obtained verification data including hardware type data relating to the modules in the device,
      compare the obtained verification data with own verification data, which own verification data includes data regarding the sensed hardware type, and
      activate the protection and/or control function only if there is a match between all verification data being compared.

2. The device according to claim 1, wherein said number of hardware modules are being connected to each other at different positions of said inter-module bus, the control unit of the process control module is further arranged to sense, via said second interface, the positions of the hardware modules on the inter-module bus, said obtained verification data also includes position type data relating to the modules in the device and the own verification data includes data regarding the sensed hardware module positions.

3. The device according to claim 1, wherein the obtained verification data includes a device identifier and the own verification data includes a pre-stored device identifier.

4. The device according to claim 1, wherein the control unit is arranged to detect the data carrier being connected to the first interface and to obtain said set-up data based on this detecting.

5. The device according to claim 1, wherein the control unit is further arranged to implement the configuration of the protection and/or control function if there is a match between all verification data being compared.

6. The device according to claim 1, wherein the control unit is further arranged to indicate that there is a mismatch if any verification data being compared do not match.

7. The device according to claim 1, wherein the control unit is further arranged to store own verification data on the portable data carrier if any verification data being compared do not match.

8. The device according to claim 1, further comprising a power supply module providing power to the other modules of the device.

9. The device according to claim 1, wherein the control unit is arranged to perform said sensing at power up of the device.

10. A method for activating a function in an intelligent electronic device provided in a Substation Automation or Distribution Automation system, the intelligent electronic device comprising a number of hardware modules connected to each other via an inter-module bus, said modules implementing various functions of the device and including a process control module for handling at least one protection and/or control function of the device, the method comprising the steps of:

sensing the types of hardware modules connected to the inter-module bus, obtaining set-up data from an external portable data carrier, said set-up data including configuration data relating to a protection and/or control function implemented by the process control module as well as verification data, said obtained verification data including hardware type data relating to the modules in the device, comparing the obtained verification data with own verification data, which own verification data includes data regarding the sensed hardware type, and activating the control and/or protection function only if there is a match between all verification data being compared.

11. The method according to claim 10, wherein said number of hardware modules are being connected to each other at different positions of said inter-module bus, the step of sensing further comprises sensing the positions of the hardware modules on the inter-module bus, said obtained verification data also includes position type data relating to the modules in the device and the own verification data includes data regarding the sensed hardware module positions.

12. The method according to claim 10, wherein the obtained verification data includes a device identifier and the own verification data includes a pre-stored device identifier.

13. The method according to claim 10, further comprising the step of detecting the data carrier being connected to the intelligent electronic device and performing the step of obtaining said set-up data based on this detecting.

14. The method according to claim 10, further comprising the step of implementing the configuration of the protection and/or control function if there is a match between all verification data being compared.

15. The method according to claim 10, further comprising the step of indicating that there is a mismatch if any verification data being compared does not match.

16. The method according to claim 10, further comprising the step of storing own verification data on the portable data carrier if any verification data being compared does not match.

17. The method according to claim 10, wherein the step of sensing is performed at power up of the device.

* * * * *